(12) United States Patent
Dahl et al.

(10) Patent No.: US 12,189,491 B2
(45) Date of Patent: *Jan. 7, 2025

(54) CENTRALIZED DATA BACKUP PLATFORM SUPPORTING MULTIPLE DATA ENVIRONMENTS

(71) Applicant: Bank of America Corporation, Charlotte, NC (US)

(72) Inventors: Erik Dahl, Newark, DE (US); Pratap Dande, Saint Johns, FL (US); Rahul Yaksh, Austin, TX (US); Vishwanath Prasad Karra, McKinney, TX (US); Steven Reich, Manalapan, NJ (US); Tileshia Brenda Alford, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/594,180

(22) Filed: Mar. 4, 2024

(65) Prior Publication Data
US 2024/0248806 A1 Jul. 25, 2024

Related U.S. Application Data

(62) Division of application No. 17/980,646, filed on Nov. 4, 2022, now Pat. No. 11,953,995.

(51) Int. Cl.
*G06F 11/14* (2006.01)
(52) U.S. Cl.
CPC ...... *G06F 11/1458* (2013.01); *G06F 2201/84* (2013.01)

(58) Field of Classification Search
CPC .................................................. G06F 11/1458
(Continued)

(56) References Cited

U.S. PATENT DOCUMENTS 10,097,823 B1 10/2018 Venkatesan et al.

FOREIGN PATENT DOCUMENTS

| CN | 109086166 | 12/2018 |
|----|-----------|---------|
| CN | 112948345 | 6/2021 |

(Continued)

OTHER PUBLICATIONS

Erin Sullivan, "Dell EMC Avamar," TechTarget, Retrieved on Sep. 21, 2022.

(Continued)

*Primary Examiner* — Syling Yen
(74) *Attorney, Agent, or Firm* — Weiss & Arons LLP

(57) ABSTRACT

A method for consolidating backup status data associated with backup operations performed at a specialty backup service platform into a centralized backup service platform may be provided. The method may include receiving data feeds associated with each backup operation, each data feed comprising backup status data associated with a backup operation performed at the specialty backup service platform. The method may also include extracting the backup status data from each data feed and following the extracting, conforming the backup status data at the centralized backup service platform to be consistent with the standardized format. The method may also include for each data feed received from the specialty backup service platform, running a performance-scan on the backup status data within the data feed for determining whether the backup operation was a success or a failure.

4 Claims, 8 Drawing Sheets

(58) Field of Classification Search
USPC .......................................................... 707/640
See application file for complete search history.

(56) References Cited

FOREIGN PATENT DOCUMENTS

| CN | 113051102 | 6/2021 |
|---|---|---|
| JP | 2019139591 | 8/2019 |

OTHER PUBLICATIONS

"Backup," Wikimedia Foundation, Inc., Sep. 13, 2022.
"What is a Data Feed?" https://www.datafeedwatch.com/academy/data-feed, Retrieved on Sep. 28, 2022.

CENTRALIZED DATA BACKUP PLATFORM SUPPORTING MULTIPLE DATA ENVIRONMENTS

CROSS REFERENCE TO RELATED APPLICATION

This application is a divisional of U.S. patent application Ser. No. 17/980,646 filed Nov. 4, 2022, and entitled "CENTRALIZED DATA BACKUP PLATFORM SUPPORTING MULTIPLE DATA ENVIRONMENTS" which is hereby incorporated by reference herein in its entirety.

FIELD OF TECHNOLOGY

Aspects of the disclosure relate to consolidating and centralizing data associated with backup operations.

BACKGROUND OF THE DISCLOSURE

Enterprise entities store large volumes of data in multiple locations. These entities require system backups that store their data. Data is typically stored for redundancy and security purposes. Backup status data is also stored. Backup status data is associated with each backup operation. This backup status data is critical to the ensuring both the security and success of the entity.

Typically, sub-entities within an enterprise, back up their data on a central backup service platform supported by the enterprise. However, one or more sub-entities may be unable to back up their data on the central backup service platform. This may be due to the high volume of the data within these individual sub-systems and/or the nature of the environment of these individual sub-systems. As such, these sub-entities may require an individual backup platform to backup its data.

Therefore, for data integrity and security purposes, it would be desirable to provide an enhanced central backup service platform configured to perform backup operations on the data from a first cluster of sub-entities and further retrieve backup status data generated by one or more backup platforms for the backup operations performed for the data from a second cluster of sub-entities.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
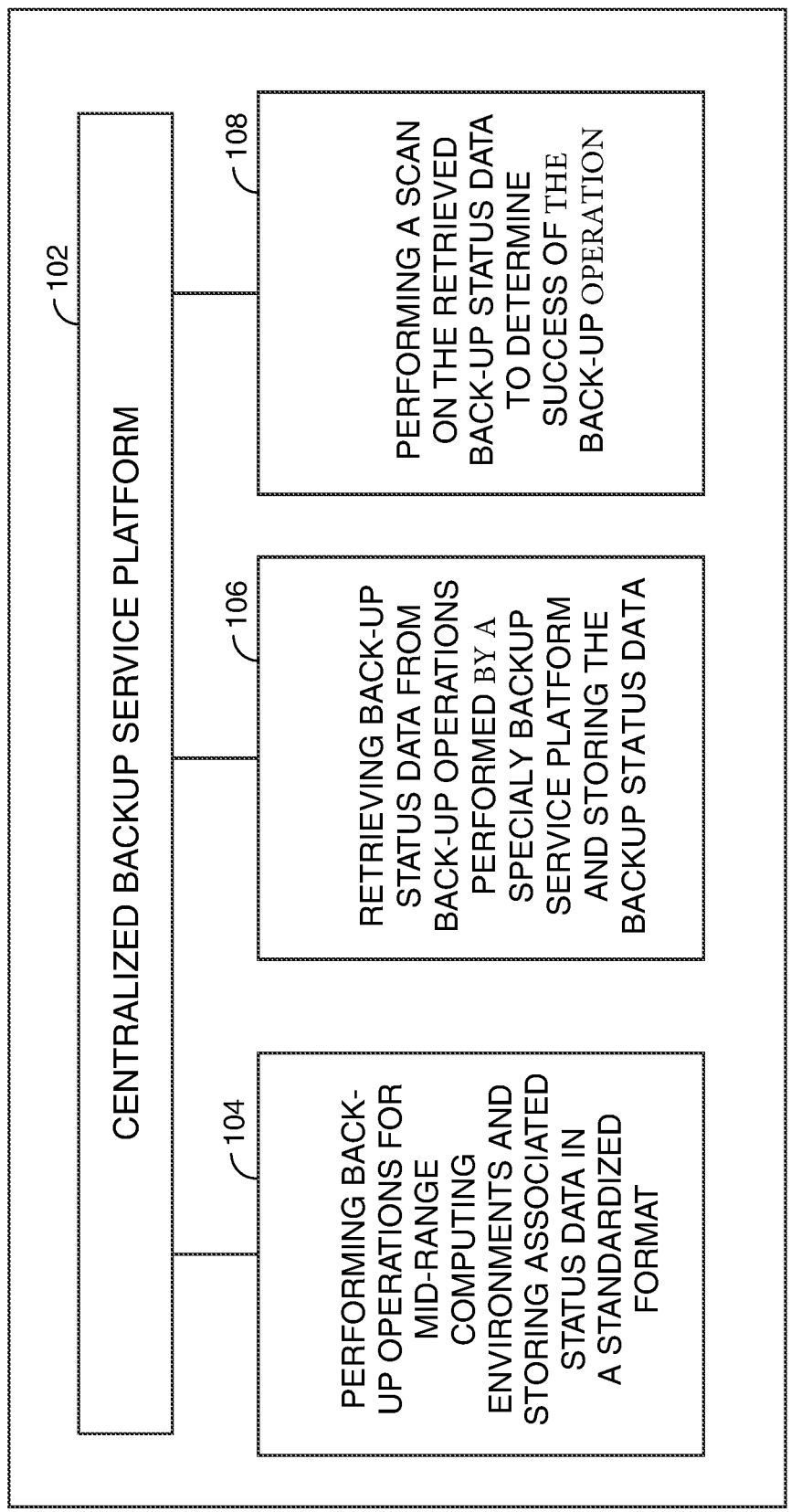
FIG. 1 shows an illustrative system diagram in accordance with principles of the disclosure.

A centralized backup system configured for backing up mid-range data from a plurality of mid-range computing environments is provided. The centralized backup system may also be configured for retrieving and consolidating back status data associated with backup operations performed at a plurality of specialty backup service platforms into a centralized backup service platform.

In some embodiments, the system may include the plurality of specialty backup service platforms where each of the specialty backup service platforms may be configured to backup data from one of a plurality of specialty computing environments. In some embodiments, the system may include a single specialty backup service platform configured to backup data from one or more specialty computing environments.

The centralized backup service platform may be a single platform where current and historical backup status for any application and computer environment within an entity may be attainable.

The centralized backup service platform may be a platform for backing up data associated with an entity. The entity may include a plurality of sub-entities. A first cluster of sub-entities may be associated with mid-range computing environments. A second cluster of sub-entities may be associated with specialty computing environments.

In some embodiments, a significant percentage of the sub-entities may be mid-range computing environments and a smaller percentage of the sub-entities may be specialty computing environments.

Mid-range computing environments may be computer environments that may fall in between mainframe computers and microcomputers. The sub-entities that may handle and manage volumes of data that may be less than the volume of data for the sub-entities that are associated within the specialty computing environments may utilize the mid-range computing environments.

The specialty computing environments may include environments that may utilize any one or more of Hadoop®, Teradata®, Data warehouses and Iseries platforms or any other suitable environment. Such computing environments may entail specialty backup processes because the data volumes are so high thereby necessitating special replication algorithms, software and tools to handle the high volume of data.

The centralized backup service platform may be a platform that may be enabled to backup the data from mid-range computing environments. All data backed up from the plurality of mid-range computing environments may be stored at the backup service platform and backup status data may also be stored within the platform.

The centralized backup service platform, in some embodiments, may utilize NetBackup® and Avamar® application tools for managing of the platform.

The specialty computing environments may necessitate individual backup platforms for backing up the data due to the high volume of data being generated and stored at the specialty computing environments.

Specialty computing environments may also necessitate data repositories for each specialty computing environment to enable handling sufficient storage space for all the data that is being backed up.

The centralized backup service platform may be configured to perform a backup operation for each of the plurality of mid-range computing environments. The backup operation may back up the data within each of the plurality of mid-range computing environments.

Each backup operation may be linked to a backup task. The backup task may identify the day and time the backup operation may be performed. The backup task may also identify what data will be backed up and the volume of data that may be included in the backup.

Each backup operation for each mid-range computing environment may be scheduled to automatically be executed at pre-determined intervals. Each interval may be every two minutes, five minutes, 10 minutes, 30 minutes, two hours, 12 hours, once a day or any other suitable interval of time.

Following each backup operation, the centralized backup service platform may be configured to store the data that is backed up.

In some embodiments, the centralized backup service platform may be enabled to trigger a one-time backup operation at a time outside the pre-determined interval.

Additionally, following each backup operation, the centralized backup service platform may be configured to store the backup task linked to the backup operation. The centralized backup service platform may also be configured to store mid-range backup status data associated with each backup operation in a standardized format.

The mid-range backup status data may include a day of the week that the backup operation was performed and the time of day the backup operation was performed. The mid-range backup status data may also include the type of data being backed up, i.e.—images, parts of a file system. The mid-range backup status data may also include a retention period. The retention period may include the amount of time the data that was backed up may be stored prior to being recycled, i.e.—30 days, 60 day or 90 days.

The centralized backup service platform may unify all status data associated with each backup in a standardized format. When users of the system search for backup data and/or status data, standardizing the data into a standardized format may enable the searching and identifying of the data to be a more quick and efficient search than when the data is not all in the standardized format.

Data that comes in from all different computing environments may need to be standardized. The standardizing of the data may include a data processing workflow that may convert the structure of different datasets into one common format of data.

The data standardization may provide a structure for creating and maintaining data quality by defining how data may be formatted. Additionally, data standardization may enable eliminating superfluous data and further may enable identifying data errors.

The centralized backup system may include a plurality of specialty backup service platforms. Each of the specialty backup service platforms may be configured for backing up specialty data from a corresponding specialty computing environment. Each of the specialty backup service platforms may be configured to perform a specialty backup operation on specialty data from the corresponding specialty computing environment.

Prior to each specialty backup service platform performing the specialty backup operation, the specialty backup service platform may create a specialty backup task linked to the specialty backup operation. The specialty backup task may identify what data is being backed up, the amount of data, and the day and time the backup operation is being performed.

Each specialty computing environment may include an individualized method for configuring the data for the specialty backup task. Each individual specialty backup service platform may perform the backup operation based on what may be defined in the specialty backup task.

The performing of the specialty backup operations may also be performed at pre-determined intervals.

Each specialty backup service platform may be configured to generate a data feed following the performing of the specialty backup operation. The data feed may include the specialty backup status data associated with the specialty backup operation performed. The specialty backup status data may include the day and time the backup operation was actually performed, the volume of data backed up and the retention period for storing the backed-up data.

In some embodiments, the data feed may also include the specialty backup task linked to the specialty backup operation.

The centralized backup service platform may further be configured to retrieve the data feed at pre-determined intervals from the corresponding individual specialty backup computing environments.

The centralized backup service platform may be configured to extract the specialty backup status data and the specialty backup task from each data feed.

For each data feed, the centralized backup service platform may be configured to run a performance-scan on the specialty backup status data. The performance-scan may be for determining whether the backup operation was performed adequately.

The performance-scan may be an application within the centralized backup service platform that may, upon execution, scan the data associated with the backup operation for determining whether the backup operation was a success, and that all data was backed up correctly.

The performance-scan application may use artificial intelligence ("AI") for identifying what may or may not have failed during the backup operation, i.e.—re-run the failed backup operation. The performance-scan application may utilize historical backup status data, backup tasks and actual data being backed up for identifying what may have failed.

Additionally, when a failure is identified, the system may trigger the associated specialty backup service platform to perform the critical backup operation. In some embodiments, the system may trigger additional backup platforms associated with other specialty computing environments to assist in backing up data when the failure occurs. The additional backup platforms may backup at least the most critical data.

It should be appreciated that each backup platform may have a customized way of backing up the data and for optimizing the storage of the backup data.

Because each backup platform may operate and perform backup operations in a customized manner, the additional backup platforms, in some embodiments, may customize the method of backing up a platform's data to produce an output that conforms with the way the associated backup platform operates.

In some embodiments, the additional backup platforms may not alter the method of backing up the data and may perform the usual method of backing up the data. Upon receipt of the backup status data from the additional backup operations, the centralized backup service platform may conform the data to be consistent with the backup status data received from the backup platform associated with the backup operation that failed.

As such, the aforementioned systems and methods provide enhanced backup platform functionalities by assisting in critical backup operations when others fail, thus expanding the capabilities of the central backup service platform and increasing enterprise data security.

The performance-scan may scan the specialty backup status data and compare it to the backup operation performed at the individual specialty backup service platform. The centralized backup service platform may also compare the data of the specialty backup task to the data within the specialty backup status data for determining a level of success of the backup operation.

When the status of the performance-scan returns an outcome of success, the centralized backup service platform may be configured to store the specialty backup status data from each data feed at the centralized backup service platform.

In some embodiments the status of the performance-scan may return the outcome of failure. The outcome of failure may signify the backup operation did not successfully backup the data.

In response to the determining of the failure of the backup operation, the centralized backup service platform may trigger a critical backup operation on at least a portion of the specialty data from the corresponding specialty computing environment.

The critical backup operation may be an operation to re-back up at least a portion of the specialty data that failed to back up properly.

The triggering may trigger the specialty computing environment associated with the failed backup operation to trigger a re-backing up of the data.

Following the triggering, the centralized backup service platform may be configured to store status data associated with the critical backup operation at the centralized backup service platform.

The centralized backup service platform may also include a front-end of the centralized backup service platform. The front-end may be configured to display the backup status data associated with each backup operation on a UI. The UI may display the mid-range backup status data from each of the mid-range backup operations. The UI may also be configured to display the specialty backup status data from each of the high-end backup operations.

Users of the system may be able to view backup status data and historical data associated with previously performed backup operations at the UI. The users may also be enabled to view backup status data associated with backup operations performed at the individual specialty backup service platforms for the specialty computing environments.

In some embodiments, following the extracting of the specialty backup status data, the centralized backup service platform may be configured to conform the specialty backup status data to the standardized format.

In some embodiments, prior to transferring the specialty backup status data to the centralized backup service platform, the individual specialty backup service platform may be configured to conform the specialty backup status data to the standardized format and then transfer the specialty backup status data in the standardized format.

A method for consolidating backup status data associated with backup operations performed at a specialty backup service platform into a centralized backup service platform is provided. The method may also include enabling monitoring a performance of the backup operations performed by the specialty backup service platform.

It should be appreciated that in some embodiments, the method may include consolidating backup status data associated with backup operations performed at a plurality of specialty backup service platforms. Each of the plurality of backup service platforms may be configured for backing up data from one or more of a plurality of specialty computing environments.

By consolidating backup status from backup operations performed outside the centralized backup service platform, this may enable users of the platform to view, manage and search all status data from any one or more sub-entities within the entity within one unified platform.

The method may include performing backup operations at the centralized backup service platform from the plurality of midrange computing environments via the centralized backup service platform.

The method may also include storing the data that is backed up at the centralized backup service platform. The method may also include storing backup status data associated with the backup operations performed at the centralized backup service platform.

In some embodiments, when the centralized backup service platform stores the data backed up from each of the plurality of midrange computing environments, the centralized backup service platform may store the data at two or more servers associated with the centralized backup service platform.

It should be appreciated that the backup status data associated with each backup operation for the plurality of midrange computing environments may be stored in a standardized format.

The backup status data may include a date and time the backup operation was performed, a type of data that was backed up and a retention period for storing the backup status data.

In parallel to the performing of the backup operations for the data from the plurality of midrange computing environments, the method may also include performing backup operations via a specialty backup service platform for one or more specialty computing environments.

In some embodiments, the backup operations performed by the specialty backup platform may be triggered via the centralized backup service platform.

The method may include, following the performing of each backup operation at the specialty backup service platform, receiving at the centralized backup service platform, data feeds associated with each backup operation. The receiving may be at pre-determined intervals.

In some embodiments, the centralized backup service platform may trigger a one-time backup operation at the specialty backup service platforms for backing up data from one or more specialty computing environments. This may be triggered when the entities data from all sub-entities may need to be reviewed and examined.

Following the one-time backup operation, the data feed from the one-time backup operation may be transferred to the centralized backup service platform.

Each data feed may include backup status data associated with a backup operation performed at the specialty backup service platform.

Following the receiving, the method may include extracting the backup status data from each data feed.

For each data feed received from the specialty backup service platform, the method may include running a performance-scan on the backup status data within the data feed for determining a status for the backup operation.

Backup operations that may be performed automatically may sometimes fail to backup the data. For example, the backup operation may backup only a portion of the data that is meant to be backed up. Additionally, the backup operation may fail to be executed at one or more pre-determined intervals causing a lag of time where data is not properly backed up. In some embodiments, the backup operation performed by a specialty backup service platform may fail due to an error or failure of the specialty backup service platform itself.

This may be a risk to the data and infrastructure of the entity in the event that there is a power failure, cyber attack on the system or any other similar occurrence.

When running the performance-scan on each of the backup status data received, this may enable identifying failures of backup operations before it may be too late to handle.

When the status of the performance-scan returns an outcome of success, the method may include storing the backup status data from each data feed at the centralized backup service platform.

In some embodiments, the status of the performance-scan may return the outcome of a failure. The outcome of failure may signify the backup operation did not successfully backup the data.

When the status of the performance-scan returns the outcome of the failure, the method may include triggering a critical backup operation on at least a portion of the specialty data associated with the backup operation performed by the specialty backup service platform. The critical backup operation may back up the portion of data that may have failed to be backed up.

The method may include, simultaneous to the triggering, notifying the specialty backup service platform of the failure.

The method may further include storing status data associated with the critical backup operation at the centralized backup service platform.

In some embodiments, when the performance-scan returns the outcome of failure, the failure may be an indication that the date the backup operation was performed is a date prior to a pre-determined acceptable date. This may indicate that one or more backup operations were not performed at the time that the backup operation was set to be performed. This may cause a lag of time that data may not have been backed up.

For example, the backup operation at the specialty backup service platform for specialty computing environment 'A' may be set to operate every 30 minutes. The specialty backup status data may indicate the time the backup operation was performed. The performance-scan may review the backup status data associated with one or more prior backup operations performed to compare the time of operation. If the time that the previous backup operation performed is greater than 30 minutes, this may indicate a failure of a backup operation.

When there may be an indication that there may have been a lag of time that data was not backed up, the method may include performing the critical backup operation on the portion of specialty data that may have been generated during the range of time extending from the date prior to the pre-determined acceptable date up until the pre-determined acceptable date.

In some embodiments, when the performance-scan returns the outcome of failure, the failure may be an indication that the amount of data that was set to be backed up is not equal to the amount of data that actually has been backed up in the backup operation.

It should be appreciated that in some embodiments the triggering of the critical backup operation may be performed via the centralized backup service platform. In other embodiments, the triggering may include triggering the specialty backup service platform to perform the critical backup operation.

The method may also include, prior to the receiving of the data feeds from the specialty backup service platform, homogenizing the backup status data to be consistent with the standardized format within the centralized backup service platform. The homogenizing of the backup status data may be performed via the specialty backup service platform prior to the transferring.

In some embodiments, the method may include following the receiving of the data feeds and extracting the backup status data, conforming the backup status data at the centralized backup service platform to be consistent with the standardized format.

The method may also include, when performing an audit during a duration of time that is outside the pre-determined intervals, generating a one-time data feed. The generating may include retrieving data feeds from the specialty backup service platform.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative system diagram of a centralized backup service platform 102 in accordance with principles of the disclosure.

As shown at 104, centralized backup service platform 102 may be configured for performing backup operations for mid-range computing environments. Centralized backup service platform 102 may further be configured for storing status data associated with the backup operations. The status data may be stored in a standardized format implemented across the centralized backup service platform 102.

As shown at 106, centralized backup service platform 102 may further be configured for retrieving backup status data from backup operations performed by a specialty backup service platform. The centralized backup service platform 102 may further be configured for storing the backup status data at the centralized backup service platform.

Backup status data from backup operations performed outside the centralized backup service platform 102 may be stored together with the backup status data generated by the centralized backup service platform 102. The backup status data generated by the centralized backup service platform 102 may be associated with the backup operations performed by the centralized backup service platform 102. This enables an open source for all backup status data and historical data for backup operations performed both by the centralized platform and individual backup platforms.

As shown at 108, centralized backup service platform 102 may also be configured for performing a scan on the retrieved backup status data to determine, for each backup status data retrieved, whether the associated backup operation was a success or a failure.

Figure 2:
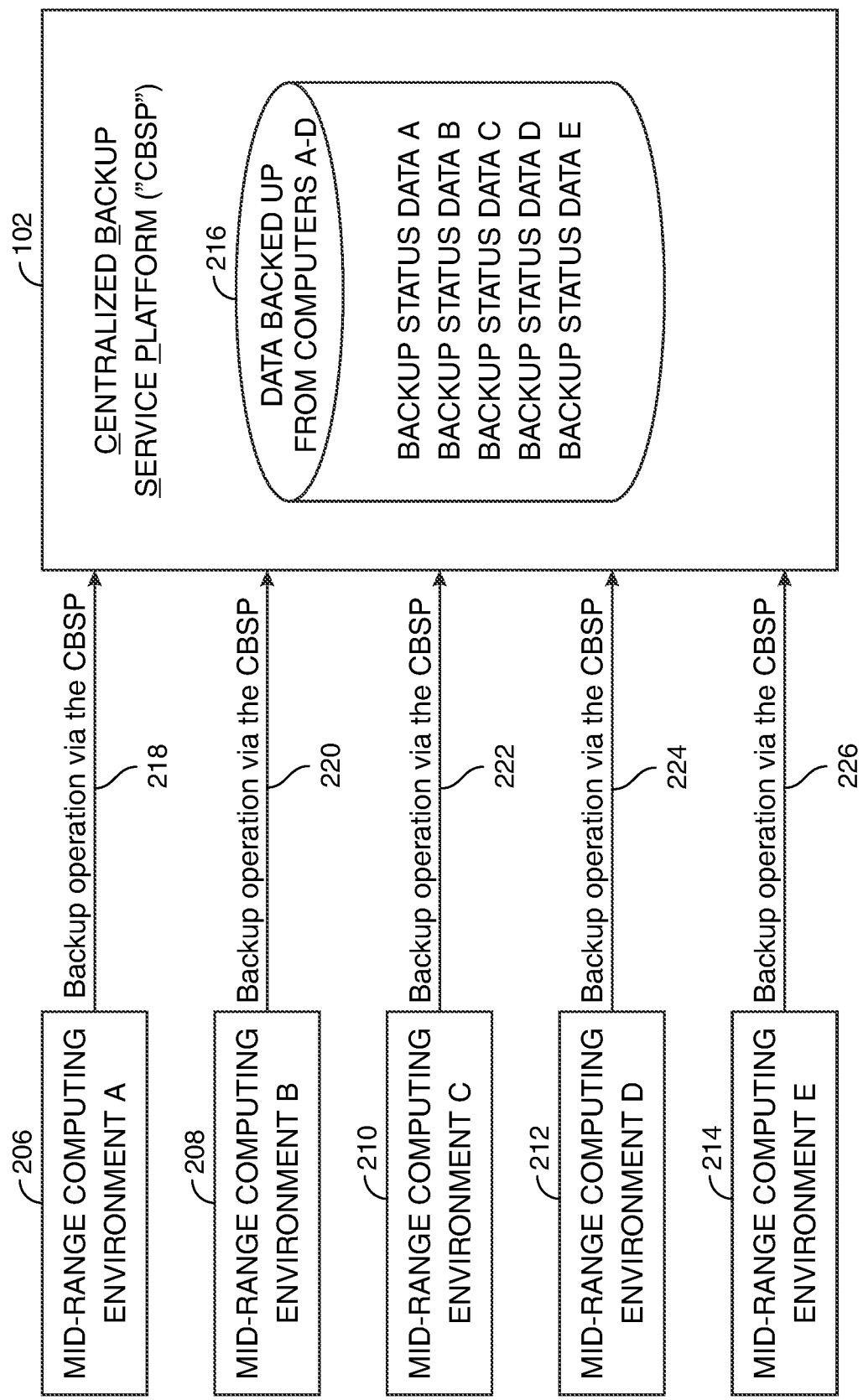
FIG. 2 shows an illustrative diagram in accordance with principles of the disclosure.

FIG. 2 shows an illustrative diagram of the centralized backup service platform 102 backing up the data from each mid-range computing environment. In this diagram, the mid-range computing environments may include mid-range computing environments A, B, C, D and E.

Mid-range computing environments may include a large plurality of the computing environments associated with sub-entities of the system. Backup operation, at 218, may be performed for all data from mid-range computing environment A, 206, via the centralized backup service platform 102. The data may be backed up by the centralized backup service platform 102 and may be stored at data repository 216 at the centralized backup service platform 102. The data that is backed up may be stored at multiple servers within the centralized backup service platform 102.

The status data associated with backup operations performed for data within mid-range computing environment may also be stored within the centralized backup service platform 102.

It should be appreciated that the backup operations shown at 218, 220, 222, 224, and 226 may be performed at pre-determined intervals. Data may be backed up every 5 minutes, 10 minutes, one hour, three hours, every 12 hours or any other suitable time frame.

The backup operation at 220 may be performed for all data from mid-range computing environment B, 208. The data may be backed up via the centralized backup service platform 102 and may further be stored at the data repository 216 within the centralized backup service platform 102.

The backup operation at 222 may be performed for backing up data from mid-range computing environment C shown at 210. The data from mid-range computing environment C may be backed up via the centralized backup service platform 102 and may further be stored at data repository 216 within the centralized backup service platform 102.

Backup operation at 224 may be performed on the data from mid-range computing environment D at 212. The data may be backed up via the centralized backup service platform 102 and may further be stored at data repository 216 within centralized backup service platform 102.

Backup operation 226 may be performed for backing up data from mid-range computing environment E at 214. The data from mid-range computing environment E may be backed up via the centralized backup service platform 102 and stored at data repository 216.

Figure 3:
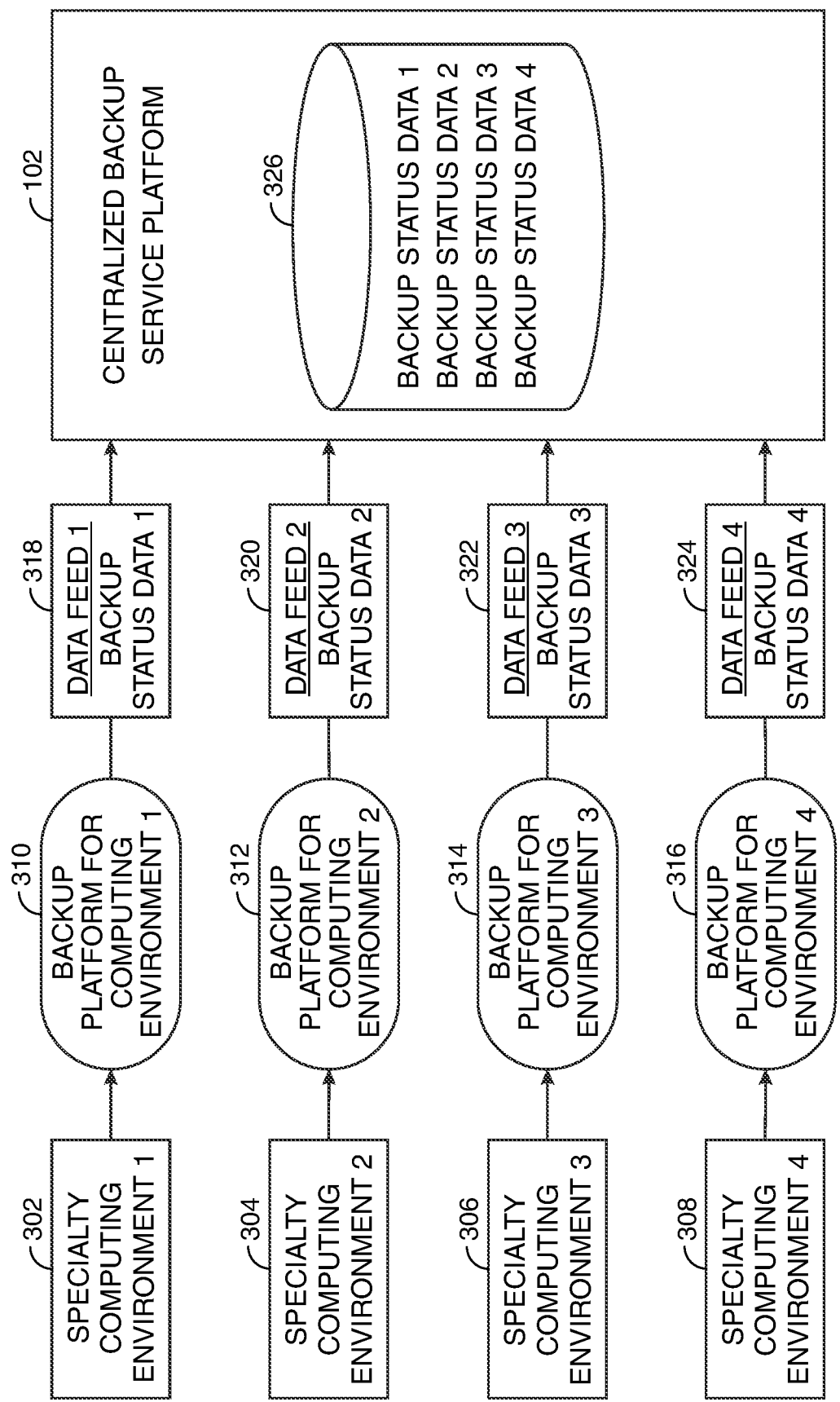
FIG. 3 shows an illustrative diagram in accordance with principles of the disclosure.

FIG. 3 shows an illustrative diagram of centralized backup service platform 102 receiving data feeds including status data from backup operations performed at individual backup platforms.

Specialty computing environments 1-4, as shown at 302, 304, 306 and 308 may be computing environments that may include massive amounts of data and may be more complex environments than the mid-range computing environments. Specialty computing environment 302-308 may include, but may not be limited to, one of Hadoop, Teradata and Iseries.

Backup platform 310 may be configured for backing up data from specialty computing environment 1 at 302. Backup platform 310 may back up the data from specialty computing environment 1 and may further be configured to store the data that is backed up. The data may be stored at one or more servers associated with specialty computing environment 1.

Backup platform 310, following each backup operation, may be configured to generate a data feed that may include backup status data associated with the backup operation performed for 302. Data feed 1 at 318 may then be transferred to centralized backup service platform 102.

Centralized backup service platform 102 may be configured to receive data feed 1 at 318 and store the backup status data at data repository 326.

Backup platform 312 may be configured for backing up data from specialty computing environment 2 at 304. Backup platform 312 may back up the data at specialty computing environment 2 and may further be configured to store the data that is backed up. The data may be stored at one or more servers associated with specialty computing environment 2, at 304.

Following each backup operation, backup platform 312 may generate a data feed that may include backup status data associated with the backup operation performed for the data from 304. Data feed 2 at 320 may then be transferred to centralized backup service platform 102.

Centralized backup service platform 102 may be configured to receive data feed 2 at 320 and store the backup status data at data repository 326.

Backup platform 314 may be configured for backing up data from specialty computing environment 3 at 306. Backup platform 314 may back up the data from specialty computing environment 3 and may be further configured to store the data that is backed up. The data may be stored at one or more servers associated with specialty computing environment 3.

Following each backup operation, backup platform 314 may be configured to generate a data feed that may include backup status data associated with the backup operation performed for the data from 306. Data feed 3 at 322 may then be transferred to centralized backup service platform 102.

Centralized backup service platform 102 may be configured to receive data feed 3 at 322 and store the backup status data at data repository 326.

Backup platform 316 may be configured for backing up data from specialty computing environment 4 at 308. Backup platform 316 may back up the data from specialty computing environment 4 and may be further configured to store the data that is backed up. The data may be stored at one or more servers associated with specialty computing environment 4.

Following each backup operation, backup platform 316 may be configured to generate a data feed that may include backup status data associated with the backup operation performed for the data from 308. Data feed 4 at 324 may then be transferred to centralized backup service platform 102.

Data repository 326 may be the same data repository as shown at 216. Data repository 326 may be a separate data repository. Both data repository 326 and data repository 216 may be associated with centralized backup service platform 102.

Backup status data at 326 and backup status data at 216 in FIG. 2 may be accessible by users of the system. The status data may be accessible via a user interface linked to the centralized backup service platform.

All backup status data from backup operations performed by the centralized backup service platform 102 and backup operations performed by individual backup platforms may be accessible via the UI associated with the centralized backup service platform.

Figure 4:
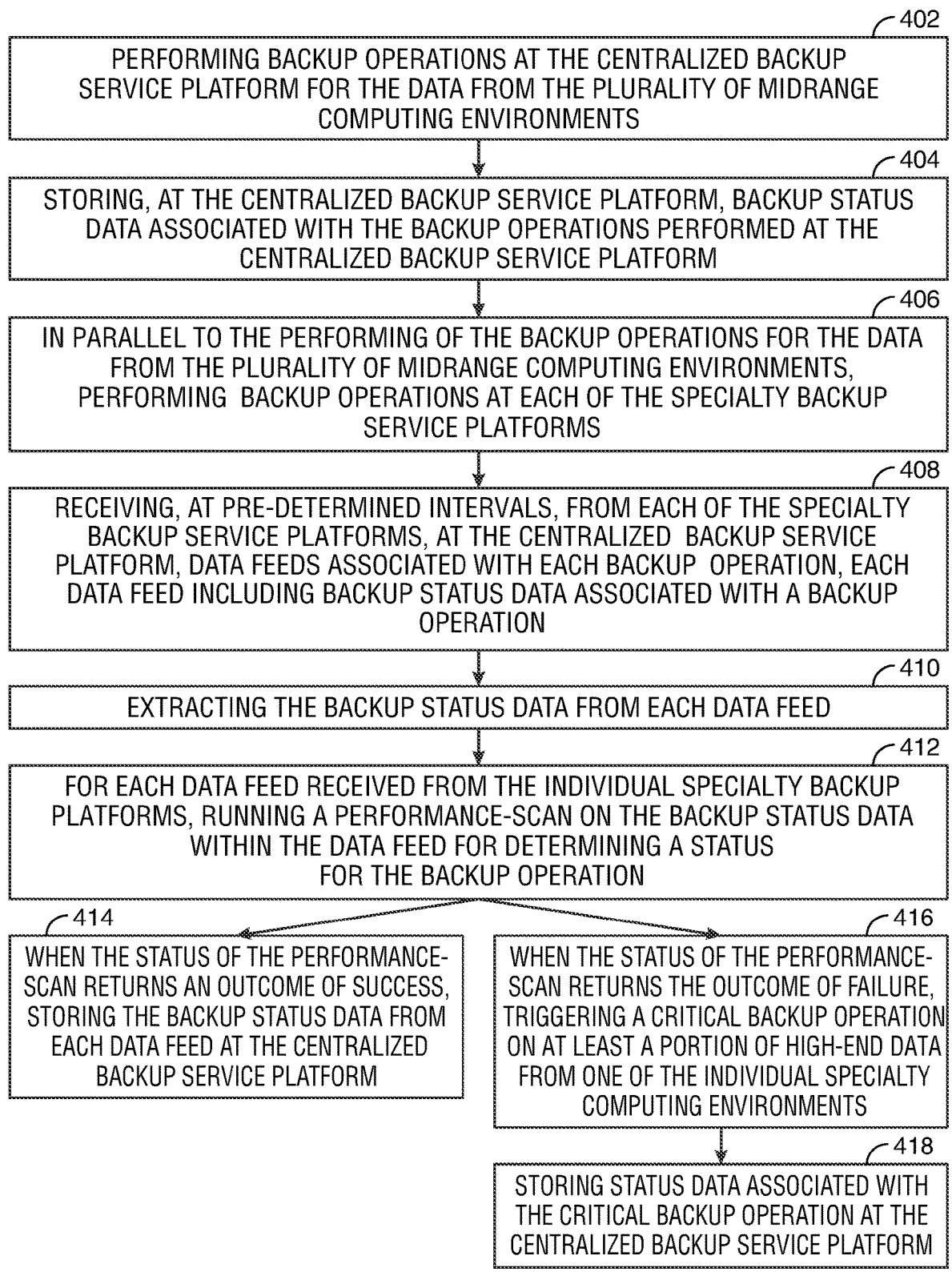
FIG. 4 shows an illustrative flowchart in accordance with principles of the disclosure.

FIG. 4 shows an illustrative flow chart in accordance with principles of the disclosure.

At 402, the method step may include performing backup operations at the centralized backup service platform for the data from the plurality of midrange computing environments.

At 404, the method step may include storing, at the centralized backup service platform, backup status data associated with the backup operations performed at the centralized backup service platform.

At 406, the method step may include, in parallel to the performing of the backup operations for the data from the plurality of midrange computing environments, performing backup operations at each of the specialty backup service platforms.

At 408, the method step may include, receiving at predetermined intervals, from each of the specialty backup service platforms, data feeds associated with each backup operation. The data feeds may be received at the centralized backup service platform. Each data feed may include backup status data associated with a backup operation.

At 410, the method step may include, extracting the backup status data from each data feed.

At 412, the method step may include, for each data feed received from the specialty backup service platforms, running a performance-scan on the backup status data. The performance-scan may be for determining a status for the backup operation.

When the status of the performance-scan returns an outcome of success, the method step at 414 may include, storing the backup status data from each data feed at the centralized backup service platform.

When the status of the performance-scan returns the outcome of failure, the method step at 416 may include, triggering a critical backup operation at the specialty backup service platform on at least a portion of high-end data from one of the individual specialty computing environments.

Following the performing of the critical backup operation at 416, the method step may include, at 418, storing status data associated with the critical backup operation at the centralized backup service platform.

Figure 5:
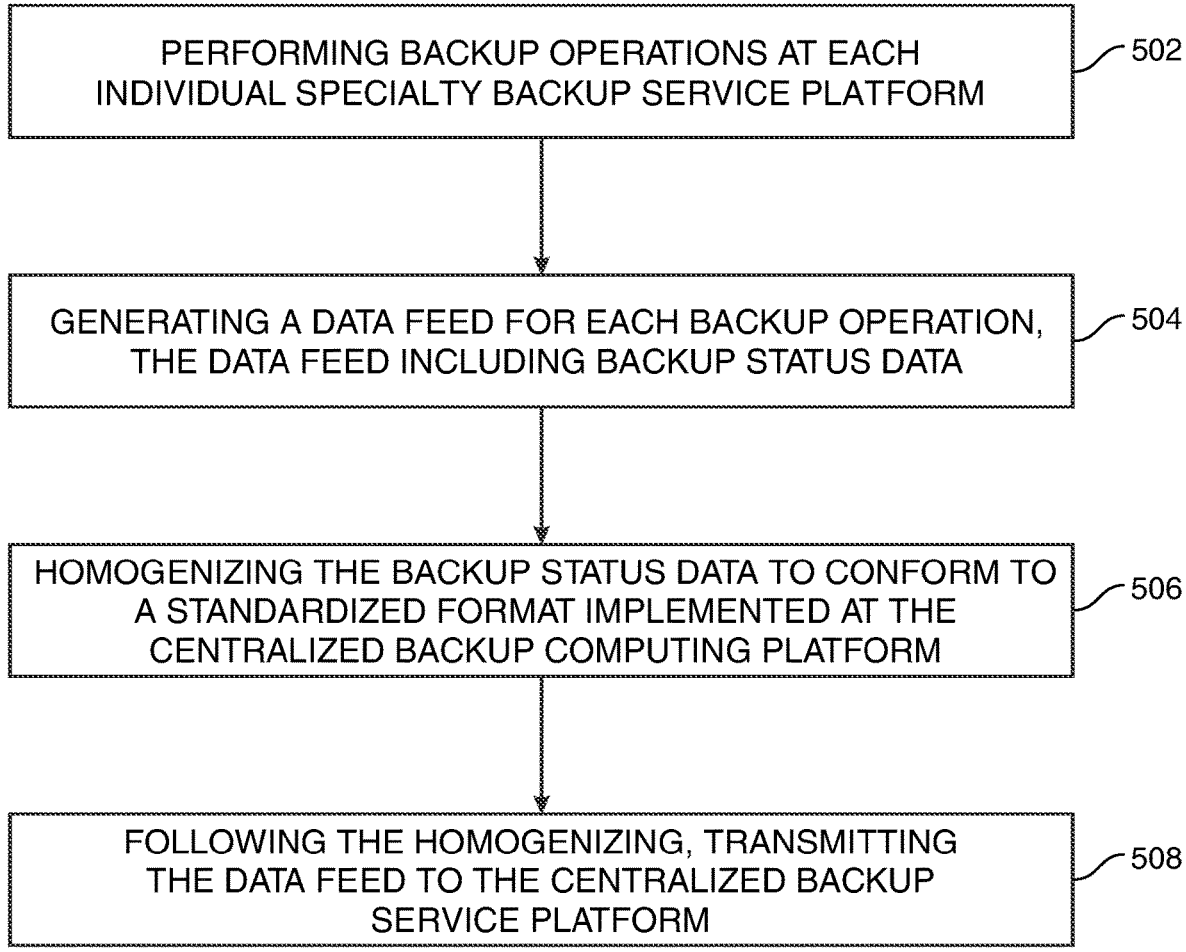
FIG. 5 shows an illustrative flowchart in accordance with principles of the disclosure.

FIG. 5 shows an illustrative flow chart in accordance with principles of the disclosure. Method steps described in the illustrative flow chart may include steps 502, 504, 506 and 508. These method steps may describe an embodiment for standardizing backup status data received from specialty computing environments.

At step 502, the method step may include performing backup operations at each individual specialty backup service platforms.

At step 504, the method step may include generating a data feed for each backup operation. Each data feed may include backup status data associated with each backup operation.

At step 506, the method step may include, homogenizing the backup status data to conform to a standardized format implemented at the centralized backup computing platform.

At step 508, the method step may include, following the homogenizing, transmitting the data feed to the centralized backup service platform.

Figure 6:
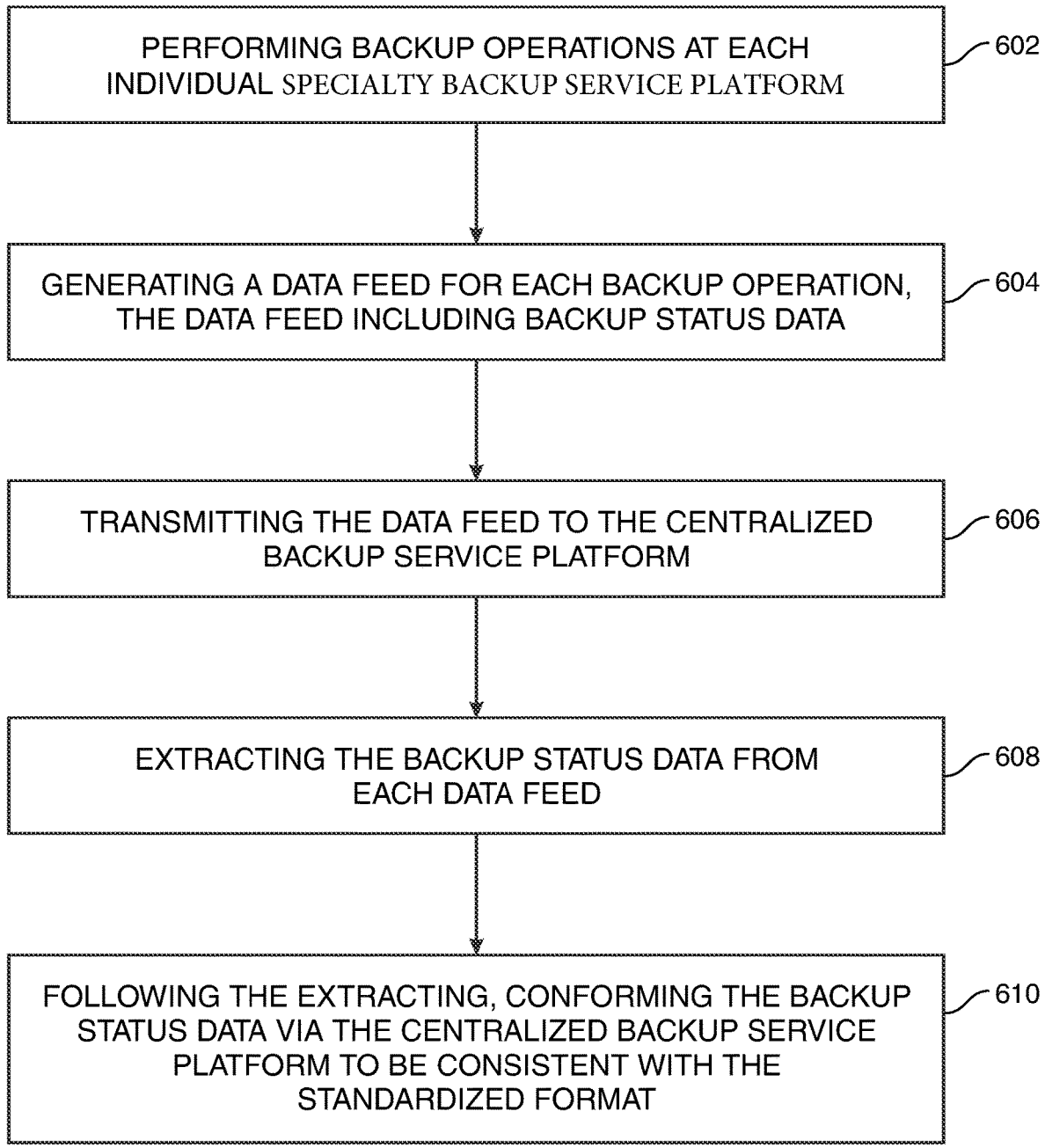
FIG. 6 shows an illustrative flowchart in accordance with principles of the disclosure.

FIG. 6 shows an illustrative flow chart in accordance with principles of the disclosure. Method steps described in the illustrative flow chart may include steps 602, 604, 606 and 608 and 610. These method steps may describe another embodiment for standardizing backup status data received from specialty computing environments.

At step 602, the method step may include performing backup operations at each of the specialty backup service platforms.

At step 604, the method step may include generating a data feed for each backup operation. The data feed may include the backup status data associated with the backup operation.

At 606, the method step may include transmitting the data feed to the centralized backup service platform.

At 608, the method step may include extracting the backup status data from each data feed.

At 610, the method step may include, following the extracting, conforming the backup status data via the centralized backup service platform to be consistent with the standardized format.

By conforming the backup status data to the standardized format via the centralized backup service platform, this may enable the specialty backup service platforms to directly transmit the backup status data to the centralized backup service platform without conforming the data prior to transmittal.

Figure 7:
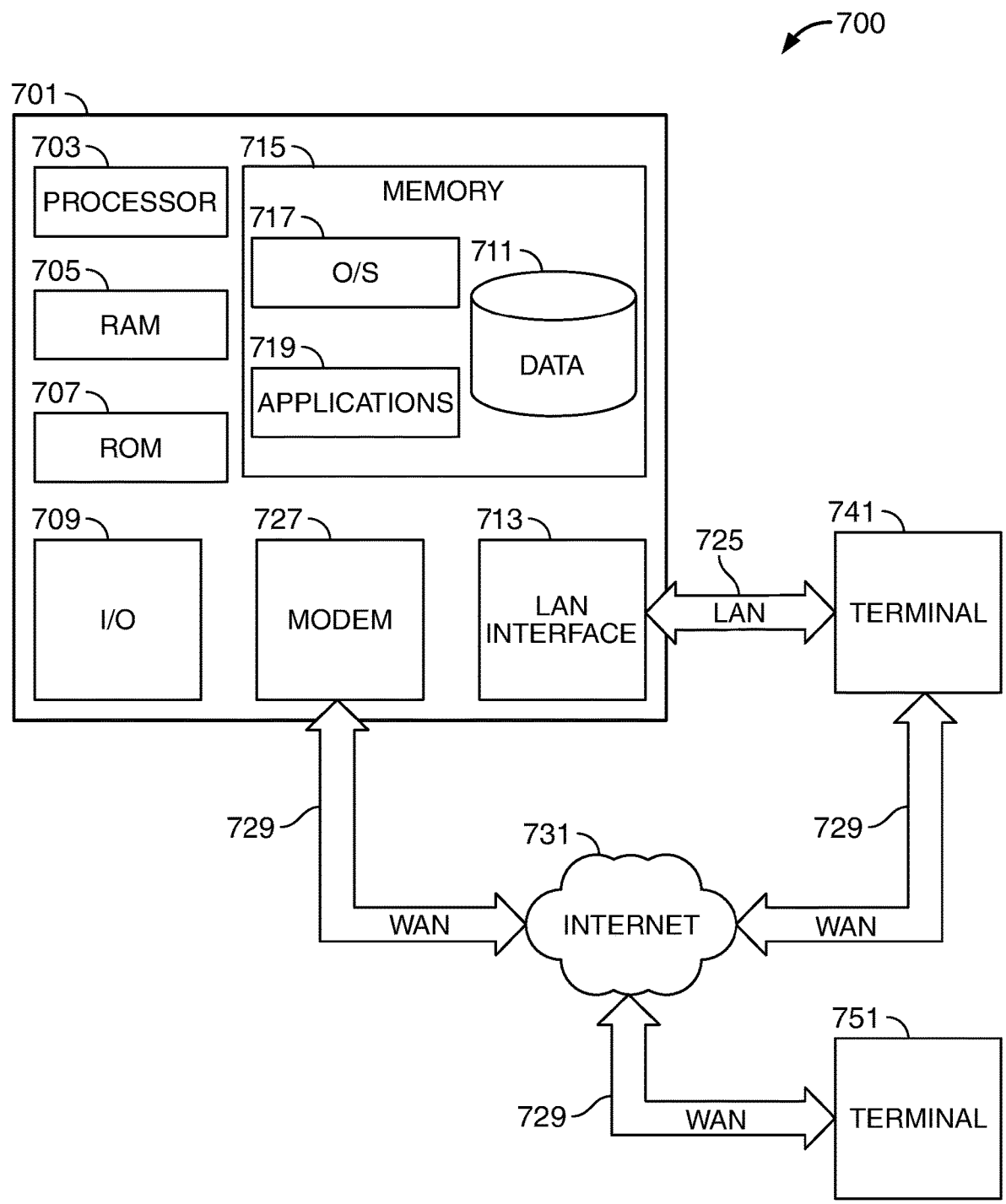
FIG. 7 shows an illustrative block diagram in accordance with principles of the disclosure.

FIG. 7 shows an illustrative block diagram of system 700 that includes computer 701. Computer 701 may alternatively be referred to herein as an "engine," "server" or a "computing device." Computer 701 may be any computing device described herein, such as the centralized backup service platform, the mid-range computing environments, the specialty computing environments and any other computing environment described herein. Elements of system 700, including computer 701, may be used to implement various aspects of the systems and methods disclosed herein.

Computer 701 may have a processor 703 for controlling the operation of the device and its associated components, and may include RAM 705, ROM 707, input/output circuit 709, and a non-transitory or non-volatile memory 715. Machine-readable memory may be configured to store information in machine-readable data structures. Other components commonly used for computers, such as EEPROM or Flash memory or any other suitable components, may also be part of the computer 701.

The memory 715 may be comprised of any suitable permanent storage technology—e.g., a hard drive. The memory 715 may store software including the operating system 717 and application(s) 719 along with any data 711 needed for the operation of computer 701. Memory 715 may also store videos, text, and/or audio assistance files. The data stored in Memory 715 may also be stored in cache memory, or any other suitable memory.

Input/output ("I/O") module 709 may include connectivity to a microphone, keyboard, touch screen, mouse, and/or stylus through which input may be provided into computer 701. The input may include input relating to cursor movement. The input/output module may also include one or more speakers for providing audio output and a video display device for providing textual, audio, audiovisual, and/or graphical output. The input and output may be related to computer application functionality.

Computer 701 may be connected to other systems via a local area network (LAN) interface 713. Computer 701 may operate in a networked environment supporting connections to one or more remote computers, such as terminals 741 and 751. Terminals 741 and 751 may be personal computers or servers that include many or all of the elements described above relative to computer 701.

In some embodiments, computer 701 may be the centralized backup service platform 102 and Terminals 741 and 751 may be any one or more of the mid-range computing environments 206-214, the specialty computing environments 302-308 that may be in electronic communication with centralized backup computing platform 102 via LAN, WAN or any other suitable electronic communication. Computer 701 may be operable to manage and monitor the backup operations performed via the centralized backup service platform 102 for all mid-range computing environments 206-214. Additionally, computer 701 may be operable to manage and monitor the backup status data from the backup operations performed via terminals 741 and 751, i.e.—specialty computing environments, and further consolidate the backup status data into the centralized backup service platform.

When used in a LAN networking environment, computer 701 is connected to LAN 725 through a LAN interface 713 or an adapter. When used in a WAN networking environment, computer 701 may include a modem 727 or other means for establishing communications over WAN 729, such as Internet 731.

In some embodiments, computer 701 may be connected to one or more other systems via a short-range communication network (not shown). In these embodiments, computer 701 may communicate with one or more other terminals 741 and 751.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 719, which may be used by computer 701, may include computer executable instructions for invoking functionality related to communication, such as e-mail, Short Message Service (SMS), and voice input and speech recognition applications. Application program(s) 719 (which may be alternatively referred to herein as "plugins," "applications," or "apps") may include computer executable instructions for invoking functionality related to performing various tasks. Application programs 719 may utilize one or more algorithms that process received executable instructions, perform power management routines or other suitable tasks.

Application program(s) 719 may include computer executable instructions (alternatively referred to as "programs"). The computer executable instructions may be embodied in hardware or firmware (not shown). The computer 701 may execute the instructions embodied by the application program(s) 719 to perform various functions.

Application program(s) 719 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 719 may include one or more algorithms that may be used to implement features of the disclosure. For example, application program(s) 719 may be the application for backing up data from the mid-range computing environments. Furthermore, application program(s) 719 may be the performance-scan application executed on backup status data received from specialty backup service platforms to determine adequacy of the backup operations.

The invention may be described in the context of computer-executable instructions, such as applications 719, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 701 and/or terminals 741 and 751 may also include various other components, such as a battery, speaker, and/or antennas (not shown). Components of computer system 701 may be linked by a system bus, wirelessly or by other suitable interconnections. Components of computer system 701 may be present on one or more circuit boards. In some embodiments, the components may be integrated into a single chip. The chip may be silicon-based.

Terminal 751 and/or terminal 741 may be portable devices such as a laptop, cell phone, Blackberry™, tablet, smartphone, or any other computing system for receiving, storing, transmitting and/or displaying relevant information. These portable devices may be operable to display a UI of the backup status data associated with all backup operations in accordance with the invention. The UI may be displaying data stored at the centralized backup service platform that may be associated with the entity. Terminal 751 and/or terminal 741 may be one or more user devices. Terminals 751 and 741 may be identical to computer 701 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smart phones, multiprocessor systems, microprocessor-based systems, cloud-based systems, programmable consumer electronics, network PCs, minicomputers, mainframe computers, distributed computing environments that include any of the above systems or devices, and the like.

Figure 8:
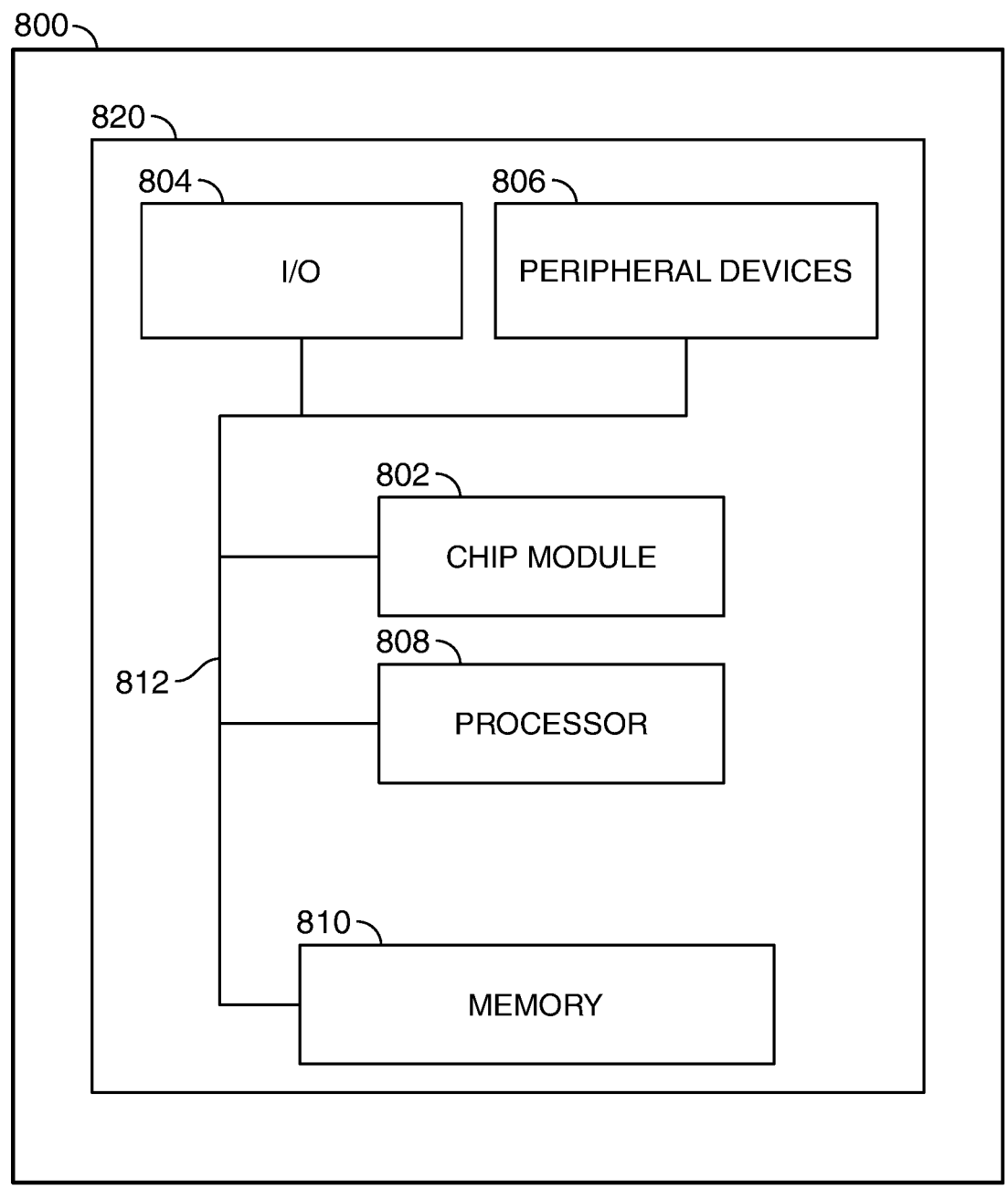
FIG. 8 shows an illustrative apparatus in accordance with principles of the disclosure.

FIG. 8 shows illustrative apparatus 800 that may be configured in accordance with the principles of the disclosure. Apparatus 800 may be a computing device. Apparatus 800 may include chip module 802, which may include one or more integrated circuits, and which may include logic configured to perform any other suitable logical operations.

Apparatus 800 may include one or more of the following components: I/O circuitry 804, which may include a transmitter device and a receiver device and may interface with fiber optic cable, coaxial cable, telephone lines, wireless devices, PHY layer hardware, a keypad/display control device or any other suitable media or devices; peripheral devices 806, which may include counter timers, real-time timers, power-on reset generators or any other suitable peripheral devices; logical processing device 808, which may compute data structural information and structural parameters of the data; and machine-readable memory 810.

Machine-readable memory 810 may be configured to store in machine-readable data structures: machine executable instructions, (which may be alternatively referred to herein as "computer instructions" or "computer code"), applications such as applications 619, signals, and/or any other suitable information or data structures.

Components 802, 804, 806, 808 and 810 may be coupled together by a system bus or other interconnections 812 and may be present on one or more circuit boards such as circuit board 820. In some embodiments, the components may be integrated into a single chip. The chip may be silicon-based.

Thus, systems and methods for consolidating backup status data associated with backup operations performed at a single specialty backup service platform or at a plurality of specialty backup service platforms into a centralized backup service platform is provided. Persons skilled in the art will appreciate that the present invention can be practiced by other than the described embodiments, which are presented for purposes of illustration rather than of limitation.

What is claimed is:

1. A centralized backup system configured for backing up mid-range data from a plurality of mid-range computing environments, the centralized backup system further configured for retrieving and consolidating backup status data associated with backup operations performed at a plurality of specialty backup service platforms into a centralized backup service platform, the centralized backup system comprising:
the centralized backup service platform, at pre-determined intervals, is configured to:
perform a backup operation, the backup operation backing up mid-range data from each of the plurality of mid-range computing environments; and
store mid-range backup status data associated with each backup operation in a standardized format;
the plurality of specialty backup service platforms, each of the specialty backup service platforms configured for backing up specialty data from a corresponding specialty computing environment, each of the specialty backup service platforms configured to, at pre-determined intervals:
perform a specialty backup operation on specialty data from the corresponding specialty computing environment; and
following the performing of the specialty backup operation, generate a data feed, the data feed comprising specialty backup status data associated with the specialty backup operation, the specialty backup status data comprising:
a date and time the backup operation was performed;
a type of data that was backed up; and
a retention period for storing the specialty backup status data; and
the centralized backup service platform further configured to:
retrieve the data feed at pre-determined intervals from the specialty backup service platform;
extract the specialty backup status data from each data feed; and
for each data feed:
run a performance-scan on the specialty backup status data for determining a status for the backup operation;
when the status of the performance-scan returns an outcome of success, store the specialty backup status data from each data feed at the centralized backup service platform; and
when the status of the performance-scan returns the outcome of failure, the outcome of failure signifying the backup operation did not successfully backup the specialty data:
determine that the date the backup operation was performed is a date prior to a pre-determined acceptable date;
in response to the determining, trigger a critical backup operation on at least a portion of the specialty data from the corresponding specialty computing environment via the specialty backup service platform, the portion of specialty backup status data comprising all the specialty data that is generated within a range, the range extending from the date prior to the pre-determined acceptable date to the pre-determined acceptable date via the specialty backup service platform, the critical backup operation backing up the portion of specialty data; and
following the triggering, store status data associated with the critical backup operation at the centralized backup service platform.

2. The centralized backup system of claim 1 wherein the centralized backup service platform is configured to, following the extracting of the specialty backup status data, conform the specialty backup status data to the standardized format.

3. The centralized backup system of claim 1 wherein each of the plurality of specialty backup service platforms is configured to, prior to generating the data feed, conform the specialty backup status data to the standardized format.

4. The centralized backup system of claim 1 wherein, the centralized backup service platform is configured to perform a retrieval of specialty backup status data from one or more of the plurality of specialty backup service platforms, during a duration of time that is outside the pre-determined intervals.

* * * * *